United States Patent [19]

Guardiani

[11] Patent Number: 5,592,039
[45] Date of Patent: Jan. 7, 1997

[54] AC AND DC MOTOR-GENERATOR SET HAVING STATORS WITH ANNULAR END PLATE WATER COOLING CHANNELS

[75] Inventor: Richard F. Guardiani, Ohio Township, Allegheny County, Pa.

[73] Assignee: Westinghouse Electric Corporation, Pittsburgh, Pa.

[21] Appl. No.: 556,248

[22] Filed: Jul. 23, 1990

[51] Int. Cl.⁶ .................. H02K 47/04; H02K 1/00; H02K 9/28
[52] U.S. Cl. .................. 310/113; 310/194; 310/227; 310/54
[58] Field of Search .................. 310/113, 194, 310/227, 54, 58, 59, 60 A, 60 R, 61

[56] References Cited

U.S. PATENT DOCUMENTS

| | | | |
|---|---|---|---|
| 668,194 | 2/1901 | Lamme | 310/269 |
| 2,469,820 | 5/1949 | Fuge | 310/54 X |
| 2,692,956 | 10/1954 | Kaczor et al. | 310/57 |
| 3,684,906 | 8/1972 | Lenz | 310/54 X |
| 4,217,511 | 8/1980 | King, Jr. et al. | 310/55 |
| 4,593,223 | 6/1986 | Lehoczky | 310/258 |
| 4,728,840 | 3/1988 | Newhouse | 310/113 |
| 4,745,314 | 5/1988 | Nakamo | 310/57 |
| 4,912,350 | 3/1990 | Parshall et al. | 310/59 X |
| 4,959,570 | 9/1990 | Nakamura et al. | 310/59 X |

Primary Examiner—David C. Cain

[57] ABSTRACT

A motor-generator set stator core includes a plurality of flat thin annular winding support plates, a pair of improved annular end plates, and a plurality of elongated flat attachment members for retaining the end plates and support plates assembled together. The improved annular end plates have substantially right triangular configurations in cross-section which are the reverse or a mirror image of one another. At hypotenuses of the right triangular cross-sections of the end plates are inner surfaces which have tapered or conical configurations that are the reverse of one another so as to conform to the outside tapered profile of the end turns of the stator windings. At short sides of the right triangular cross-sections of the end plates are radial planar surfaces which engage the opposite outer side portions of the stacked support plates. At long sides of the right triangular cross-sections of the end plates are circumferential cylindrical outer surfaces which connected at their inner ends with the radial planar surfaces. Each end plate has an annular radially outwardly projecting flange formed at the outer ends of the circumferential outer surfaces of the end plates. Each end plate has an annular cooling water-carrying channel of substantially triangular cross-section defined therein which is continuous around the entire annular extent of the end plate and a plurality of circumferentially-spaced orifices extending between the channel and the outer surface of the end plate.

17 Claims, 8 Drawing Sheets

AC AND DC MOTOR-GENERATOR SET HAVING STATORS WITH ANNULAR END PLATE WATER COOLING CHANNELS

RIGHTS OF THE GOVERNMENT

The invention described herein was made in the course of work performed under Contract No. N-00024-83-C-4181 awarded by the United States Government.

CROSS REFERENCE TO RELATED APPLICATIONS

Reference is hereby made to the following copending patent applications dealing with related subject matter and assigned to the assignee of the present invention:

1. "Internally-Located Rotating Union For A Motor-Generator Set" by Brian L. Newhouse, assigned U.S. Ser. No. 042,184 and filed Apr. 24, 1987. (W.E. 53,613)
2. "AC And DC Motor-Generator Set With Ferromagnetic Spiders Shrunk Fit On Water-Cooled Low-Ferromagnetic Rotor Shaft" by James A. Drake, assigned U.S. Ser. No. 149,240 and filed Jan. 27, 1988. (W.E. 54,163)continued in U.S. Ser. No. 560,508, filed Jul. 20, 1990 both abandoned.

BACKGROUND OF THE INVENTION

1. Field of the Invention

The present invention relates generally to secondary power sources and, more particularly, is concerned with an AC and DC motor-generator set employing modified annular end plates for improved water cooling of the windings of high power density AC and DC stators in the motor-generator set.

2. Description of the Prior Art

A secondary power source is typically provided in a nuclear submarine to generate reserve power. As the primary power source of the submarine, its nuclear power plant is operated to power the submarine; it also powers the secondary power source to charge DC batteries. Then, during periods when the nuclear plant is shut down or knocked off-line, the reserve power of the DC batteries is used to restart the primary source via the secondary source to operate the submarine.

One typical secondary power source used heretofore employs an AC and DC motor-generator set in which the AC and DC components are disposed in tandem arrangement on and along a common shaft. During periods of nuclear power plant operation, the AC component functions as a motor to rotatably drive the common shaft and thereby run the DC component as a generator to charge the DC batteries. Then, during periods when the nuclear power plant is shut down, the DC batteries operate the DC component as a motor to rotatably drive the common shaft and thereby run the AC component as a generator to operate the submarine.

Historically, the AC and DC components were cooled by air flow about the peripheries thereof. However, air cooled systems have many shortcomings. They are large and heavy and are noisy due to vane turbulence of their fans. Because of higher power density demands and the need to conserve space and weight in a submarine as well as for the submarine to operate quietly, a primary design objective is to minimize the size and weight of components of the motor-generator set.

The cooling of the motor-generator set primarily by using water, as opposed to air, has been recently adopted as a better way to cool the motor-generator set. Water cooling offers greater opportunities to further reduce component size and weight and to make the set operate more quietly. U.S. Pat. No. 4,728,840 to Newhouse, assigned to the assignee of the present invention, discloses an improved arrangement for water cooling the AC and DC rotors of the motor-generator set.

Water cooling also has been adopted heretofore for cooling the cores of the AC and DC stators of high power density motor-generator sets. The cores of these stators are constructed of a plurality of flat annular plates (also known as "punchings") which when assembled or stacked together are used to support the stator windings. These stator cores also include an annular end plate (also known as a "fingerplate") disposed at each opposite end of the stack of support plates and a plurality of axially-extending attachment members (also known as "building bars") which are circumferentially spaced about the stack of support plates. The attachment members are installed in axial slots in the periphery of the stacked support plates and are rigidly fixed, such as welding, to the support plates and the end plates in order to retain the stack of support plates together.

The required power density of AC and DC stators is such that cooling the stator cores with forced air is not adequate for obtaining winding temperatures compatible with the electrical insulation materials being used in the motor-generator set. The addition of a cooling water system as the primary stator winding cooling means is required. Several approaches to water cooling have been proposed in the prior art.

One approach is to provide water cooling via passages running directly in the stator core windings. However, this approach has been rejected because it necessitates a network of cooling water passages that would be too complex. Further, the brazed joints necessary for electrically connecting the windings would have insufficient reliability (would have too great a potential for producing water leaks).

Another approach that has been adopted is to cool stator cores by incorporation of metal cooling water jacket assemblies, such as of stainless steel, shrunk onto the outside diameter of the stator cores. The jacket assemblies contain passages through which the ship's cooling water is circulated to remove heat generated in the stator windings and core during operation. The passages in the cooling water jacket assembly are obtained by welding an outer jacket cylinder onto an inner jacket cylinder having a labyrinth passageway formed on its outer surface that faces an inner surface of the outer jacket cylinder.

However, even though the cooling water jacket assembly approach is better than incorporating water flow passages directly in the stator windings, it too has several drawbacks which contribute to an overall lack of robustness of this adopted approach. First, the jacket assemblies which are not required for providing structural support for the respective stators do add considerable weight, amounting to approximately ten percent of the total motor-generator set weight.

Second, the motor-generator set stators axially are very short relative to their diameters. As a consequence, only about one-third of the total winding length is in contact with the stator cores, with the remaining two-thirds of the winding length making up end turns. Therefore, the thermal resistance between the ends of the winding end turns and the stator cooling water in the jacket assemblies is relatively high due to the long conduction path. The maximum surface temperature of the windings is located at the ends of the winding end turns which are the farthest locations from the cooling water.

Third, the convective film coefficient of water in the water cooling jacket assemblies must be maintained as high as possible to minimize the maximum winding surface temperature; however, the pressure drop allowed for the ship's water in the motor-generator set is very small, thereby significantly limiting water velocities and convective film coefficients. This results in the necessity of the complex water passage labyrinth design to minimize pressure drop and maximize film coefficients in the AC and DC stator cooling water jacket passages.

Fourth, even with the use of water in the cooling water jacket assemblies for cooling the stator windings and cores, some forced air is still needed for cooling the stator winding end turns to limit the maximum winding surface temperature to acceptable limits. This requires considerable free space on both sides of the winding end turns (inside diameter and outside diameter) for adequate air circulation. This requirement precludes significant support of the winding end turns during shock loads.

Consequently, a need still exists for further improvement of approaches to water cooling of AC and DC stator cores and windings in the motor-generator set.

SUMMARY OF THE INVENTION

The present invention provides a design to satisfy the aforementioned needs. The AC and DC motor-generator set of the present invention employs modified and improved annular end plates for improved water cooling of the windings of high power density AC and DC stators in the motor-generator set. The improved end plates contain continuous water carrying channels which permit elimination of the prior art cooling water jacket assemblies, providing significant weight reduction and improvement of manufacturability of the stator. Furthermore, the elimination of the water jacket assemblies reduces the diameter of the stator allowing a potential for reduction of the motor-generator set width. Also, the improved end plates achieve shortened conduction paths between the stator windings and the cooling water circulating within the end plates. The maximum winding surface temperature is now located in the middle of the windings where the windings are surrounded by the stack of support plates which provide a thermal mass that will minimize the rate of increase of the maximum temperature during transients (thermal and electrical) and thereby increase available response time.

Accordingly, the present invention is directed to improved annular end plates for a motor-generator set stator core that includes a plurality of flat thin annular plates and a plurality of elongated flat attachment members. The annular plates are assembled in a stacked side-by-side relation and have respective inner circumferential portions with circumferentially-spaced radially-extending slots aligned with one another in the axial direction for receiving and supporting the stator windings. The improved annular end plates are disposed at opposite axial ends of the stack of thin annular support plates. The attachment members extend in the axial direction and are circumferentially spaced about the stack of support plates. The attachment members are seated in axial-extending recesses defined in the peripheries of the stacked support plates and are rigidly affixed to the support plates and end plates in order to retain the side-by-side stacked support plates assembled tightly together with one another and with the end plates.

The improved annular end plates of the present invention have bodies of substantially right triangular configurations in cross-section which are the reverse or a mirror image of one another. At the hypotenuses of the right triangular cross-sections of the end plate bodies are inner surfaces which have tapered or conical configurations that are the reverse of one another so as to conform to the outside tapered profile of the end turns of the stator windings. At the short sides of the right triangular cross-sections of the end plate bodies are radial planar surfaces which engage the opposite outer side portions of the stacked support plates. At the long sides of the right triangular cross-sections of the end plate bodies are circumferentially-extending cylindrical outer surfaces which connected at their inner ends with the radial planar surfaces. Also, each improved end plate has an annular radially outwardly projecting flange formed on the body at the outer ends of the circumferential outer surfaces of the end plates. Further, each improved end plate has an annular cooling water-carrying channel defined in the body which is continuous around the entire annular extent of the end plate body and a plurality of circumferentially-spaced orifices extending through the end plate body between the channel and the outer surface of the end plate body. The channel is of substantially triangular shape in cross section.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Prior Art Motor-Generator Set

Referring now to the drawings, and particularly to FIGS. 1–6, there is illustrated a prior art AC and DC motor-generator set, generally designated by the numeral 10. Basically, the prior art motor-generator set 10 includes a generally cylindrical central shaft 12 extending through a sealed housing 14 and being rotatably mounted at its opposite ends by bearings 16 which, in turn, are support by end portions 18 of the housing 14. The set 10 also includes annular-shaped AC and DC rotors 20, 22 supported in tandem relationship along the central shaft 12 for rotation therewith, and annular-shaped AC and DC stators 24, 26 which encompass the respective AC and DC rotors 20, 22 in closely spaced relationship thereto.

More particularly, the AC and DC rotors 20, 22 have respective annular pole body spiders 28, 30 shrunk fitted on the central shaft 12 and having multiple circumferentially-spaced radially-extending projections 28A, 30A thereon. The AC rotor pole body spider 28 has four such projections 28A thereon being angularly displaced from one another by ninety degrees, whereas the DC rotor pole body spider 30 has six such projections 30A thereon being angularly displaced from one another by sixty degrees. Except for the different number of projections, the AC and DC rotor pole body spiders 28, 30 are otherwise virtually identical. Thus, the description set forth hereinafter of the prior art AC rotor 20 will apply equally to the DC rotor 22 also.

Figure 1:
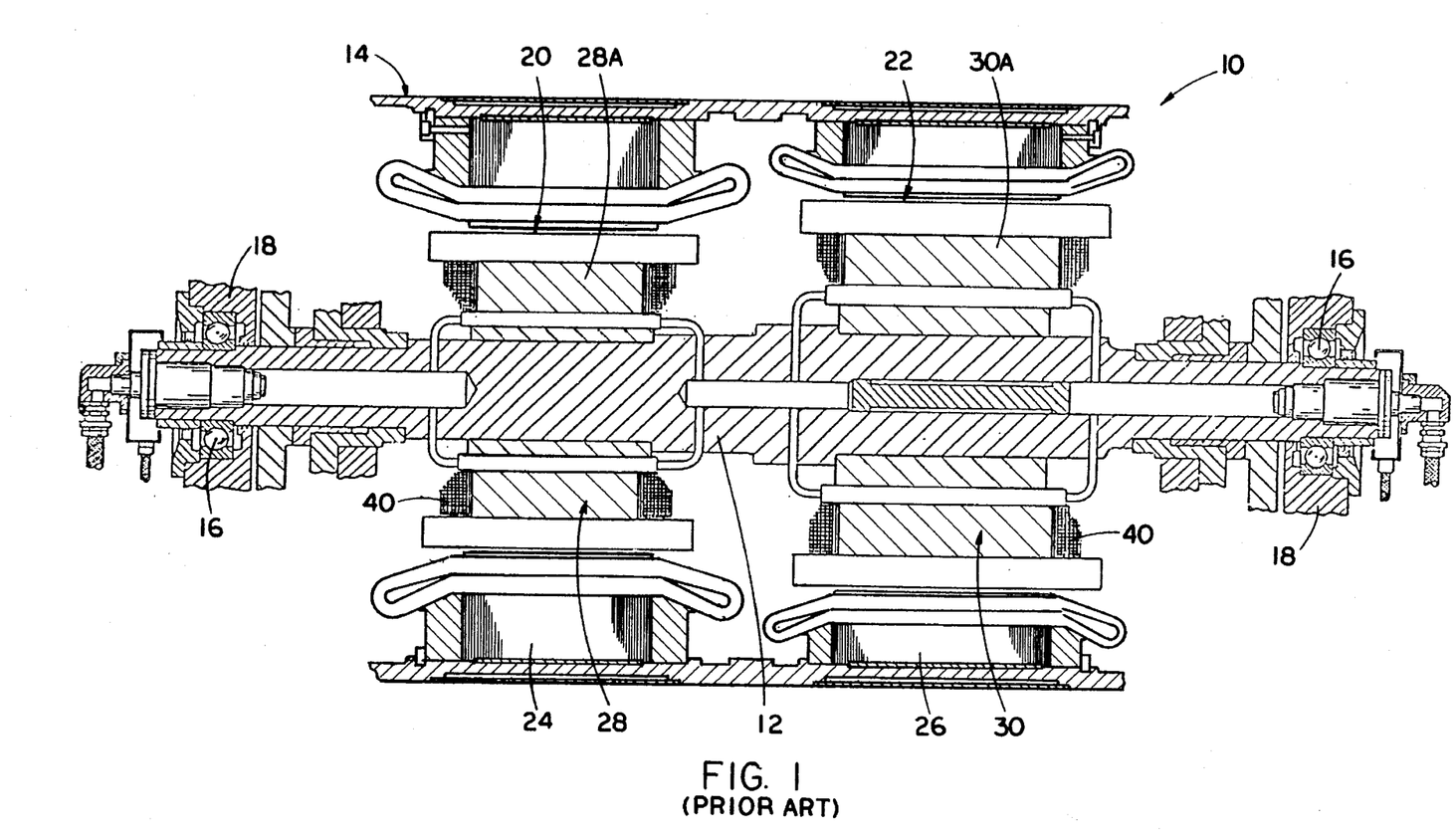
FIG. 1 is a longitudinal axial sectional view of the prior art motor-generator set.
Figure 2:
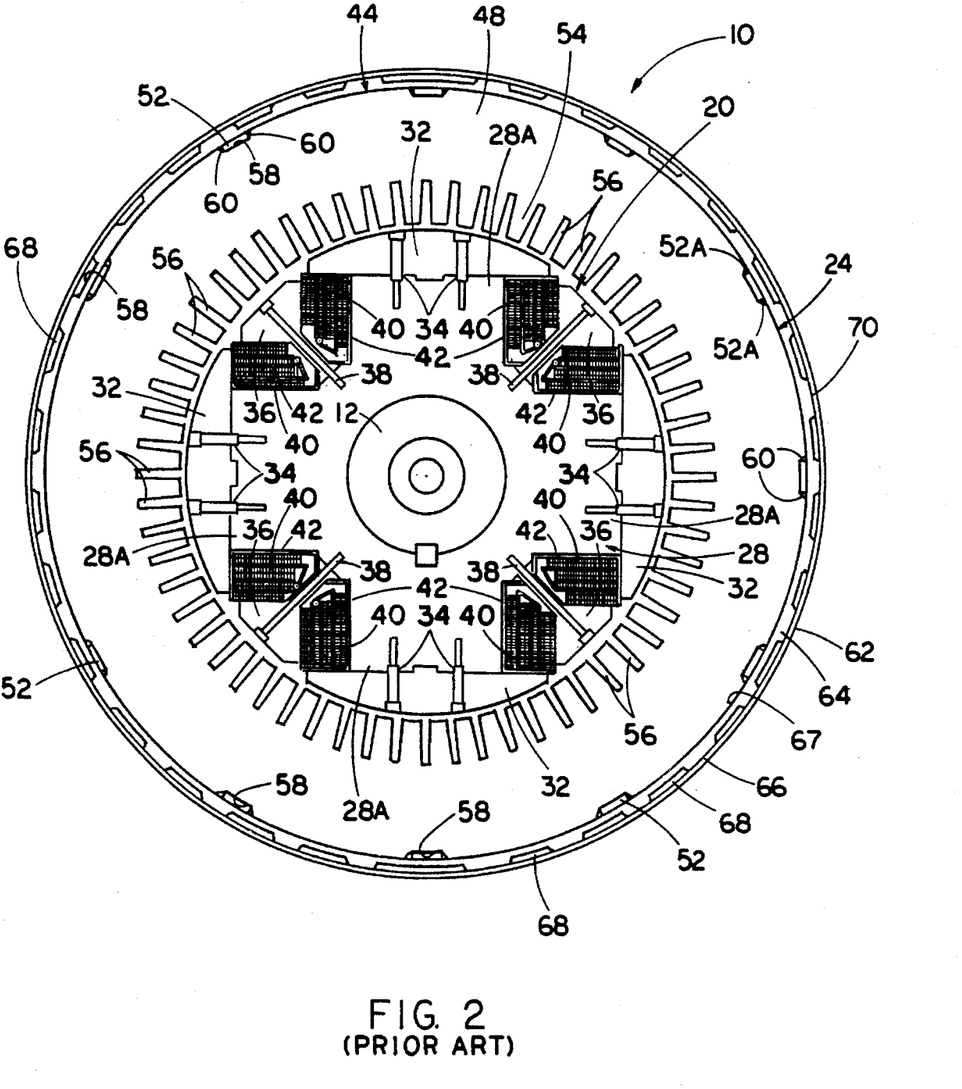
FIG. 2 is a cross-sectional view of the AC side of the prior art motor-generator set of FIG. 1.

Referring to FIG. 2, the AC rotor 20 of the prior art motor-generator set 10 includes a pole head 32 fastened on the projections 28A of its pole body spider 28. A plurality of threaded fasteners 34 are removably inserted through the respective rotor pole heads 32 and threaded into the respective projections 28A of the rotor pole body spiders 28 for removably attaching the pole heads 32 thereto. Also, the AC rotor 20 includes respective wedges 36 and capscrews 38 attached to the pole body spiders 28 for maintaining the integrity of the electrical field coils 40 which surround bobbins 42 installed about the outer circumferentially spaced projections 28A of the rotor pole body spider 28.

Prior Art Cooled Stator Core

Referring to FIGS. 3–6, the AC stator 24 of the prior art motor-generator set 10 includes a stator core 44 and windings 46. The stator core 44 includes a plurality of flat thin annular plates 48 (also called "punchings"), a pair of annular end plates 50 (also called "fingerplates"), and a plurality of elongated flat attachment members 52 (also called "building bars"). The thin annular plates 48 of the stator core 44 are assembled in a stacked side-by-side relationship to one another and have respective inner circumferential portions 54 (also called "fingers") with circumferentially-spaced radially-extending slots 56 defined therein and aligned with one another in the axial direction of the stator 24 for receiving and supporting the windings 46. The annular end plates 50 of the stator core 44 are disposed at opposite axial ends of the stack of thin annular support plates 48.

Figure 5:
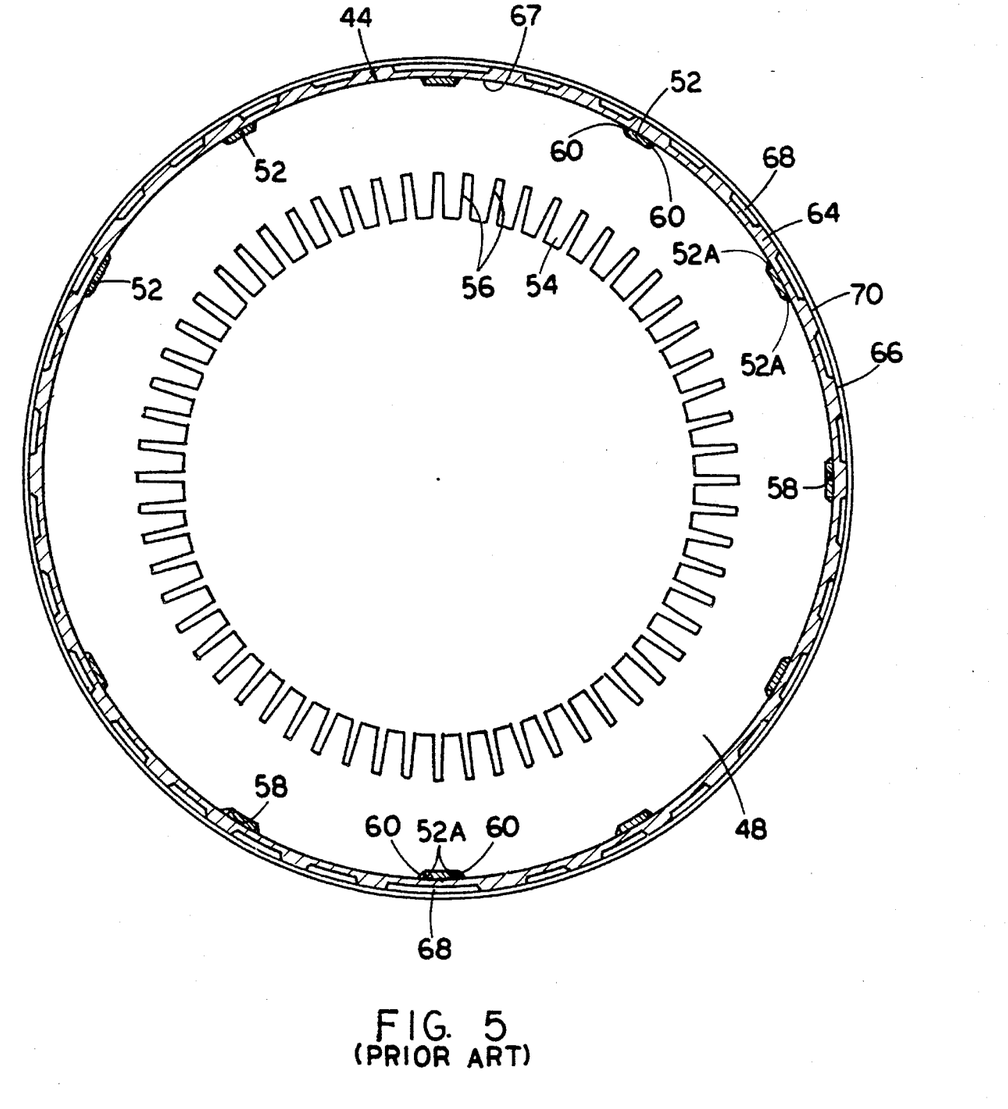
FIG. 5 is an enlarged cross-sectional view of the prior art stator core taken along line 5—5 of FIG. 4.
Figure 6:
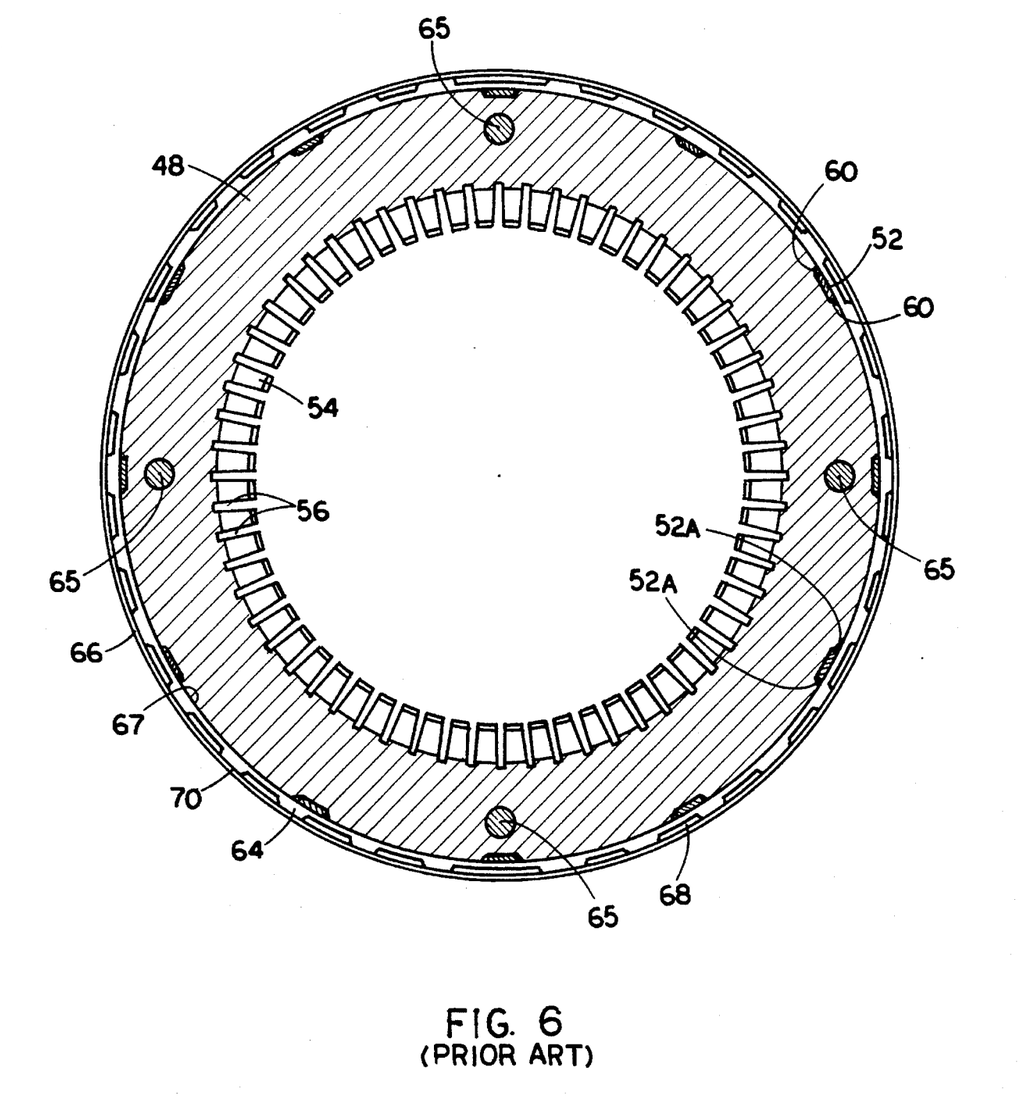
FIG. 6 is another enlarged cross-sectional view of the prior art stator core taken along line 6—6 of FIG. 4.

The attachment members 52 of the stator core 44 extend in the axial direction and are circumferentially spaced about the stack of support plates 48. The attachment members 52 are installed in axial-extending recesses 58 formed by aligned notches defined in the peripheries of the stacked support plates 48. The attachment members 52 are rigidly fixed, such as by welds 60, to the support plates 48 and the end plates 50 along opposite longitudinal edges 52A of the attachment members 52, as seen in FIGS. 5 and 6, in order to retain the support plates 48 and end plates 50 assembled tightly together.

The required power density of the AC stator 24 (and also the DC stator 26) is such that cooling the stator core 44 with forced air alone is not adequate for obtaining winding temperatures compatible with the electrical insulation materials being used in the motor-generator set 10. As shown in FIGS. 2–6, a cooling water jacket assembly 62 is provided as the primary means for cooling the stator windings 46.

The cooling water jacket assembly 62 is shrunk fit onto the outside diameter of the stator core 44. The jacket assembly 62 includes an inner cylindrical member 64 and an outer cylindrical member 66, both extending circumferentially about the stator core 44 and concentric with the longitudinal axis thereof. The outer cylindrical member 66 surrounds the inner cylindrical member 64 and is a thin-walled sleeve-like cylinder. The inner cylindrical member 64 is a thick-walled sleeve-like cylinder, compared to the thin-walled cylinder of the outer cylindrical member 66. A split retainer ring 63 and a series of circumferentially spaced screws 65 are employed to anchor the inner cylindrical member 64 at its interior surface 67 to the end plates 50 of the stator core 44.

Also, the inner cylindrical member 64 of the jacket assembly 62 has a recess 68 defined circumferentially about its exterior surface 70 with steps or ledges 72 defined along its opposite axially spaced edges for receiving and supporting the outer cylindrical member 66 in overlying relation to the recess 68. The recess 68 has a labyrinth shape (not shown) to form a labyrinth passageway between the inner and outer cylindrical members 64, 66 when the outer cylindrical member 66 is attached, such as by welding, to the inner cylindrical member 64. The cooling water is circulated through the recess or passageway 68 to remove heat generated in the stator windings 46 and core 44 during operation.

Figure 3:
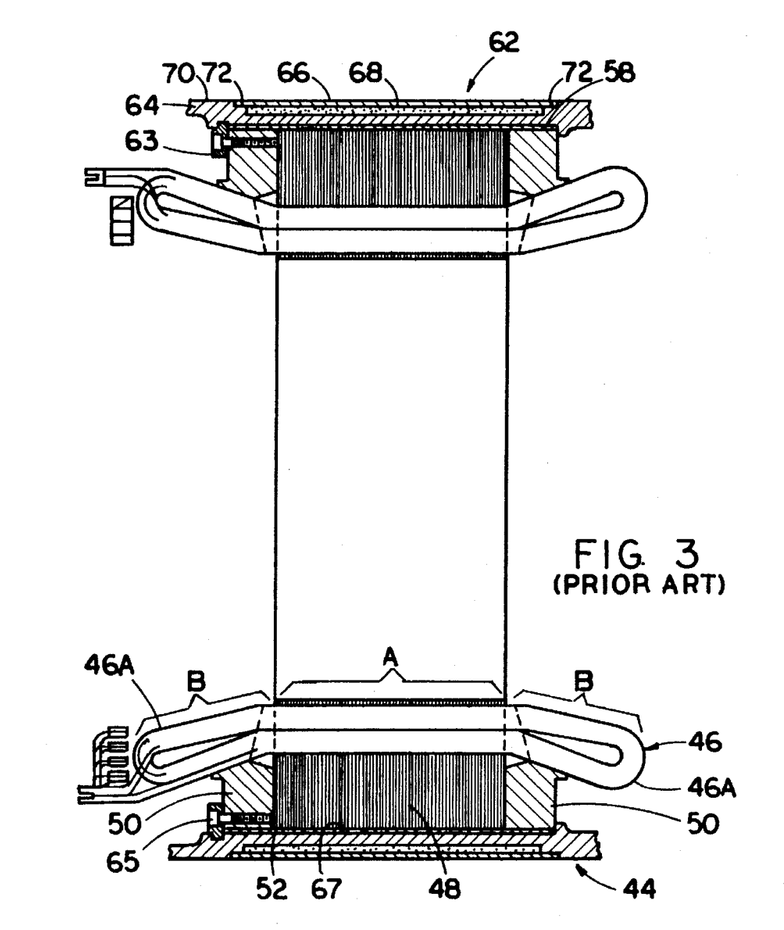
FIG. 3 is a longitudinal axial sectional view of the stator core and winding of the prior art stator of motor-generator set of FIG. 1.
Figure 4:
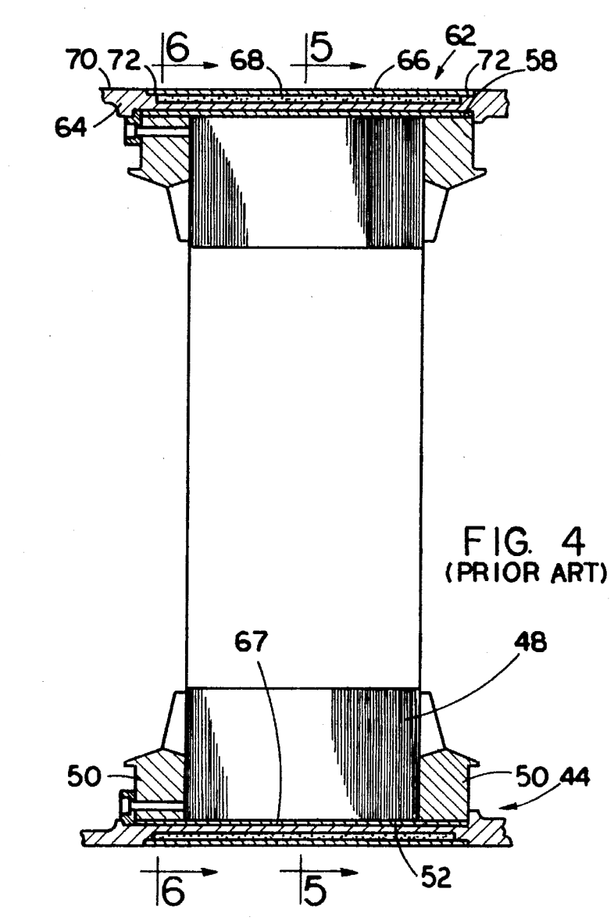
FIG. 4 is a longitudinal axial sectional view of the stator core of the prior art stator of FIG. 3 alone.
Figure 9:
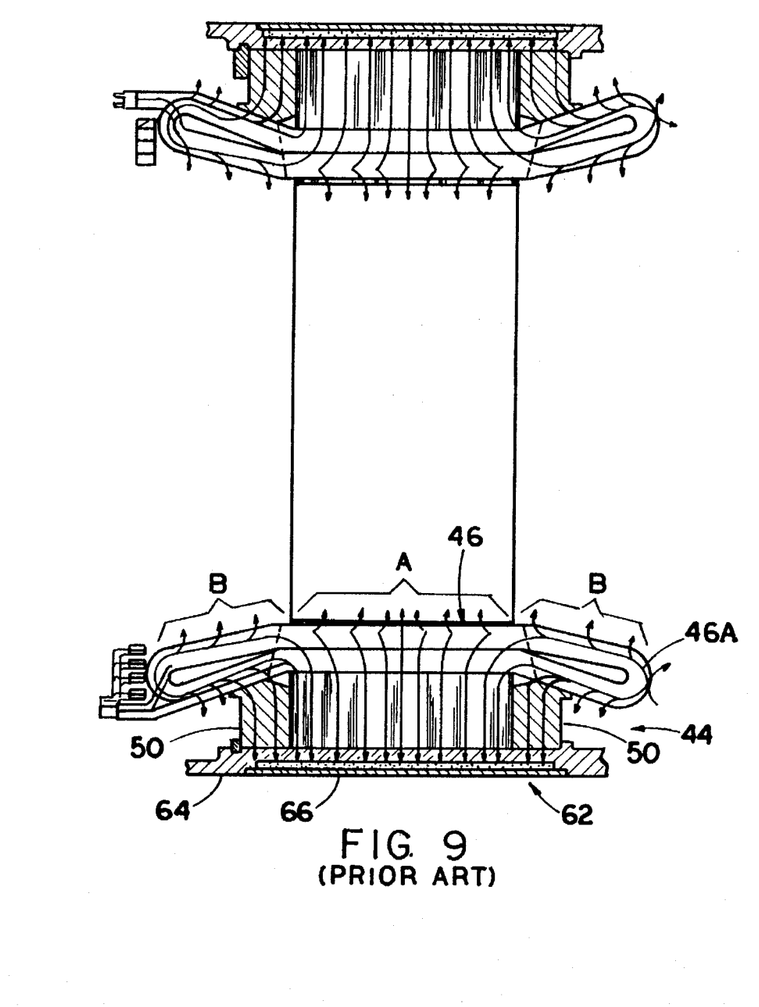
FIG. 9 is a longitudinal axial sectional view of the stator core and winding showing the thermal conduction path in the prior art stator.

Referring to FIGS. 3 and 9, it readily can be realized that the stator core 44 is very short axially compared to its diameter. As a consequence, disadvantageously only about one-third (length A) of the total length of the windings 46 is in contact with the stator core 44, with the remaining two-thirds (lengths B) of the winding length making up end turns 46A. Therefore, the thermal resistance between the ends 46B of the winding end turns 46A and the stator cooling water in the jacket assembly 62 is relatively high due to the long conduction path. The maximum surface temperature of the windings 46 is located at the ends 46B of the winding end turns 46A which are the farthest points from the cooling water flowing in the passageway 68.

Improved Water Cooled Stator Core of Present Invention

Figure 7:
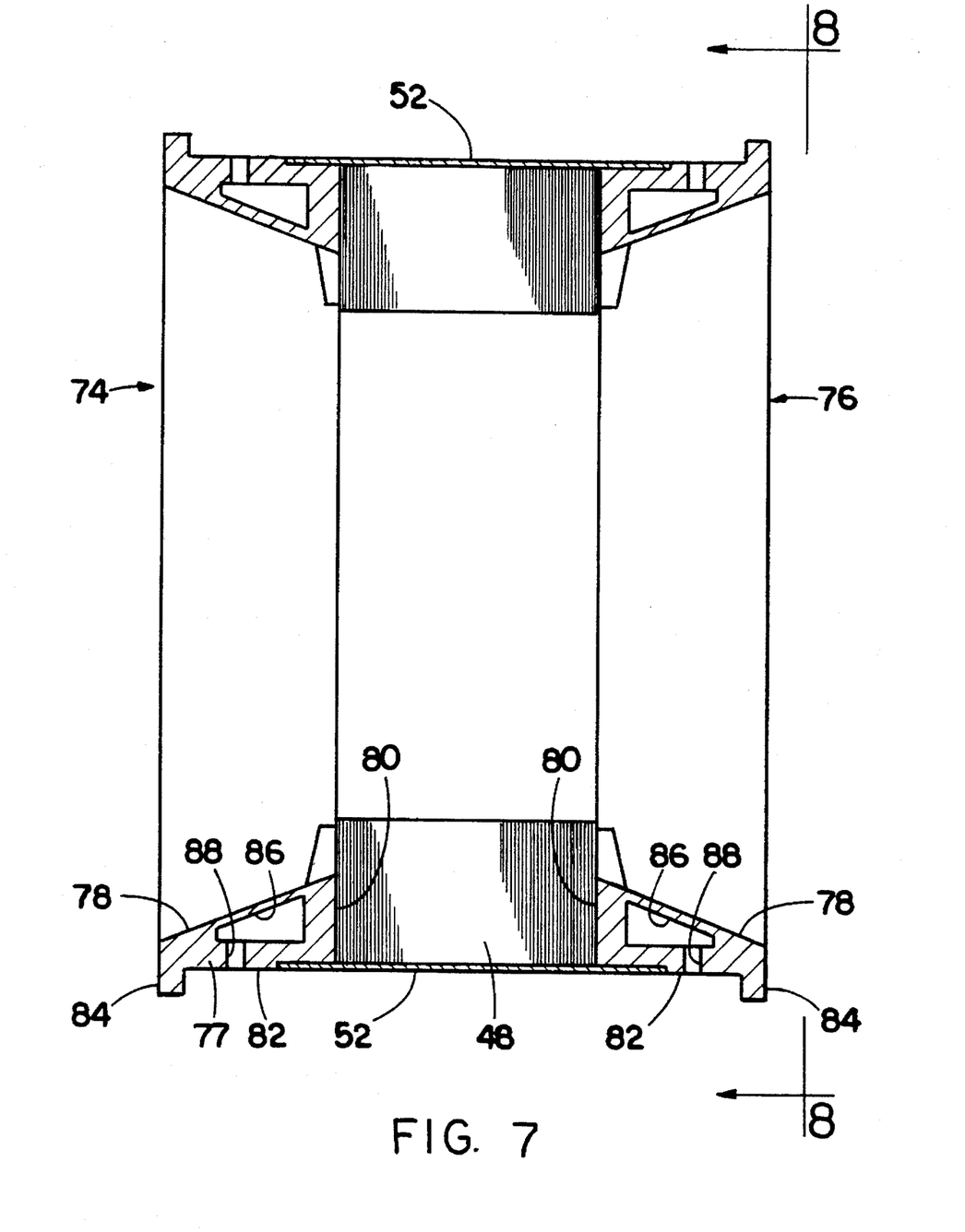
FIG. 7 is a longitudinal axial sectional view of a stator core in accordance with the present invention.
Figure 8:
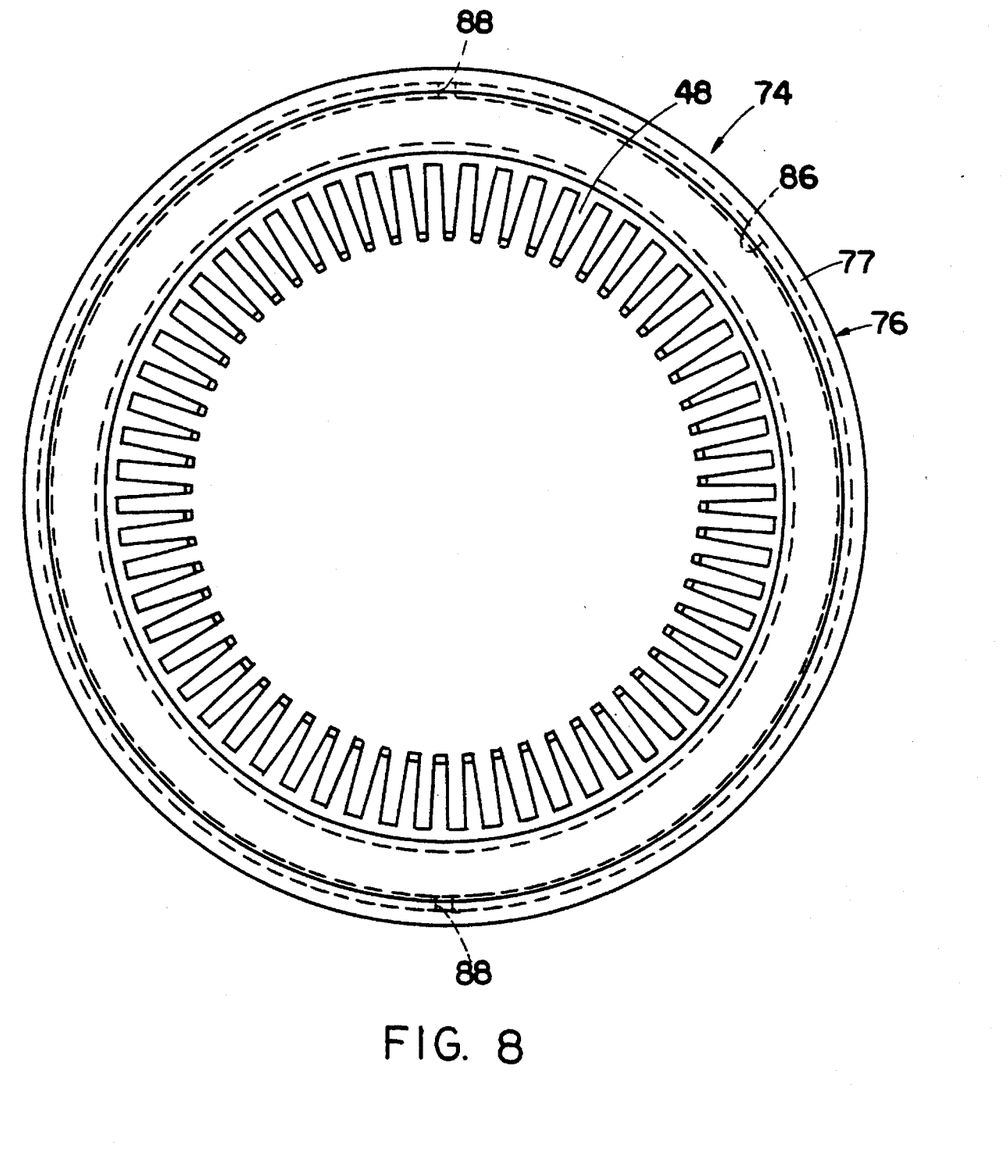
FIG. 8 is an end elevational view of the stator core of the present invention as seen along line 8—8 of FIG. 7.
Figure 10:
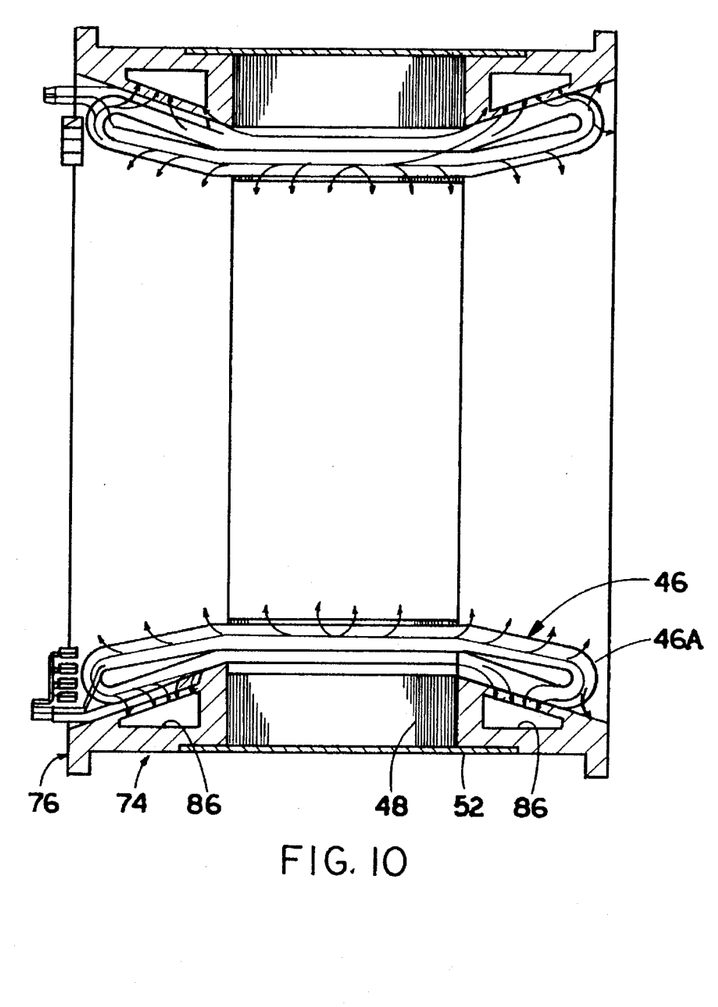
FIG. 10 is a longitudinal axial sectional view of the stator core and winding of the stator of the present invention showing the thermal conduction path in the stator core and winding of the stator.

Referring to FIGS. 7, 8 and 10, there is illustrated an AC stator core 74 incorporating improvements for eliminating the cooling water jacket assembly 62 of the prior art and still providing more efficient water cooling of the stator windings 46. The improvements incorporated by the AC stator core 74 are equally applicable to the DC stator core (not shown) so that a description of the AC stator core 74 will suffice for the DC stator core as well. The motor-generator set 10 of FIGS. 1 and 2 can employ the improved water cooled AC and DC stator cores. The main difference between the improved stator core 74 and the prior art stator core 44 is in the modified annular end plates 76 which provide the improved water cooling and permit elimination of the cooling water jacket assembly 62 of the prior art stator. As can be seen in FIGS. 7, 8 and 10, the improved stator core 74 employs the stack of flat annular support plates 48 and the plurality of attachment members 52 such as used in the prior art stator 44.

More particularly, the modified and improved annular end plates 76 are annular bodies 77 of substantially right triangular configurations in cross-section which are the reverse or a mirror image of one another. At the hypotenuses of the right triangular cross-sections of the end plate bodies 77 are inner surfaces 78 which have tapered or conical configurations that are the reverse of one another so as to conform to the outside tapered profile of the end turns 46A of the stator windings 46. At the short sides of the right triangular cross-sections of the end plate bodies 77 are radial planar surfaces 80 which engage the opposite outer side portions of the stacked support plates 48. At the long sides of the right triangular cross-sections of the end plate bodies 77 are circumferentially-extending cylindrical outer surfaces 82 which intersect and connected at their inner ends with the radial planar surfaces 80.

Also, each improved end plate 76 has an annular radially outwardly projecting flange 84 formed on the body 77 at the outer ends of the circumferential outer surfaces 82 of the end plate body 77. The flanges 84 permit bolting to other structures of the motor-generator set such as the bearing brackets and machinery mount supports.

Finally, the body 77 of each improved end plate 76 has an annular cooling water-carrying channel 86 defined therein which is continuous around the entire annular extent of the end plate body 77. A plurality of circumferentially-spaced connecting orifices 88 extend through the end plate body 77 between the channel 86 and the outer surface 82 of the end plate body 77. Preferably, the channel 86 is of substantially triangular shape in cross section, although other cross-sectional configurations are possible. The orifices 88 provide means for connecting to cooling water piping (not shown) at the top and bottom of the improved end plates 76.

The improved design of the stator core end plates 76 has the following advantages. First, the cylindrical cooling water jacket assembly 62 of the prior art stators 24, 26 is eliminated, providing significant weight reduction. Second, elimination of the cooling water jacket assembly 62 reduces the diameter of the motor-generator set 10 allowing a potential for reduction of the set width. Third, elimination of the cooling water jacket assembly 62 improves manufacturability of the stators. Machining of the outside diameters of the stators is eliminated as well as shrinking and keying of the jacket assemblies 62 to the stators.

Fourth, air gaps between the stator winding end turns 46A and the improved end plates 76 with vacuum impregnation of the wound stator leaves a direct, short conduction path between the windings 46 and the cooling water circulating through the channels 86 of the improved end plates 76. The short thermal conduction path minimizes the need for high convective film coefficients between the cooling water and the improved end plate channel walls, allowing the design to be optiminzed based on the cooling water pressure drop requirements. This provides a robust design relatively insensitive to flow velocities in the end plate flow channels 86. A comparison of FIGS. 9 and 10 illustrates graphically the improved conduction paths from the windings 46 in the case of the improved end plates 76. FIG. 10 also shows the maximum and minimum conduction paths between the windings 46 and cooling water and the shift of the location of the maximum winding surface temperature to the middle of the windings 46.

Fifth, the maximum winding surface temperature, located in the middle of the windings 46 (in lieu of the end turn 46A), is surrounded by the stacked support plates 48. The surrounding thermal mass will minimize the rate of increase in maximum winding surface temperature during transients (thermal and electrical) and thereby increase available response time. Sixth, the improved end plates 76 provide excellent support for the stator windings 46 during shock. Seventh, the cooling water channels 86 in the improved end plates 76 provide a well-protected method for piping cooling water to and from air coolers mounted on the top of the set 10. Eighth, the maintainability of the motor-generator set 10 is improved since stator replacement would not require unshrinking a stator from the cooling water jacket assembly 62. A simple unbolting operation is all that would be required.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A stator core for a motor-generator set, comprising:
   (a) means for supporting a plurality of windings along middle portions thereof, said supporting means having a pair of opposite lateral side surfaces;
   (b) a pair of annular end plates disposed respectively at said opposite side surfaces of said supporting means; and
   (c) means for connecting with said supporting means and said end plates to retain them in an assembled unit;
   (d) each of said end plates having an annular body with an outer surface, an annular cooling water-carrying channel defined and enclosed in said body and extending continuously around the entire annular extent thereof, and at least one orifice extending through said body between said channel and said outer surface of said body.

2. The stator core as recited in claim 1, wherein said end plate includes a plurality of circumferentially-spaced orifices extending through said end plate body between said channel and said outer surface thereof.

3. The stator core as recited in claim 1, wherein said bodies of said end plates have substantially right triangular configurations in cross-section which are mirror images of one another.

4. The stator core as recited in claim 3, wherein said right triangular cross-sectional annular end plate bodies each have a long side, a short side and a hypotenuse side interconnecting said long and short sides.

5. The stator core as recited in claim 4, wherein at said hypotenuse sides of said right triangular cross-sections of said end plate bodies are inner surfaces having tapered configurations that are the reverse of one another and conform to an outside tapered profile of end turns of the stator windings supported by and extending laterally from said supporting means.

6. The stator core as recited in claim 4, wherein at said short sides of said right triangular cross-sections of said end plate bodies are radial planar surfaces which engage said opposite outer sides of said supporting means.

7. The stator core as recited in claim 6, wherein at said long sides of said right triangular cross-sections of said end plate bodies are said outer surfaces circumferentially-extending and cylindrical in shape and connecting at inner ends with said radial planar surfaces of said bodies.

8. The stator core as recited in claim 4, wherein said end plates include annular radially outwardly projecting flanges formed at outer ends of said outer surfaces of said bodies.

9. The stator core as recited in claim 1, wherein said channel through each said end plate body is of substantially triangular shape in cross section.

10. A motor-generator set stator core, comprising:
   (a) a stack of flat thin annular plates for supporting stator windings and having opposite axially-spaced lateral sides;
   (b) a pair of annular end plates disposed at said opposite axially-spaced sides of said stacked annular plates; and
   (c) a plurality of elongated flat attachment members extending in the axial direction, circumferentially spaced about said stack of annular plates, and rigidly affixed to said annular plates and said end plates so as to retain them assembled together as a unit;
   (d) said end plates having respective annular bodies with outer surfaces and substantially right triangular configurations in cross-section being mirror images of one another, each said body including an annular cooling water-carrying channel defined and enclosed in said body and extending continuously around the entire annular extent thereof the end plate and at least one orifice extending through said body between said channel and said outer surface of said body.

11. The stator core as recited in claim 10, wherein said end plate includes a plurality of circumferentially-spaced orifices extending through said end plate body between said channel and said outer surface thereof.

12. The stator core as recited in claim 10, wherein said right triangular cross-sectional annular end plate bodies each have a long side, a short side and a hypotenuse side interconnecting said long and short sides.

13. The stator core as recited in claim 12, wherein at said hypotenuse sides of said right triangular cross-sections of said end plate bodies are inner surfaces having tapered configurations that are the reverse of one another and conform to an outside tapered profile of end turns of the stator windings supported by and extending laterally from said supporting means.

14. The stator core as recited in claim 12, wherein at said short sides of said right triangular cross-sections of said end plate bodies are radial planar surfaces which engage said opposite outer sides of said supporting means.

15. The stator core as recited in claim 14, wherein at said long sides of said right triangular cross-sections of said end plate bodies are said outer surfaces circumferentially-extending and cylindrical in shape and connecting at inner ends with said radial planar surfaces of said bodies.

16. The stator core as recited in claim 10, wherein said end plates include annular radially outwardly projecting flanges formed at outer ends of said outer surfaces of said bodies.

17. The stator core as recited in claim 10, wherein said channel through each said end plate body is of substantially triangular shape in cross section.

* * * * *